US009920936B2

United States Patent
Aoyagi et al.

(10) Patent No.: US 9,920,936 B2
(45) Date of Patent: Mar. 20, 2018

(54) AIR CONDITIONING APPARATUS

(71) Applicant: Mitsubishi Electric Corporation, Tokyo (JP)

(72) Inventors: Yoshiro Aoyagi, Tokyo (JP); Taro Hattori, Tokyo (JP); Koji Matsuzawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1004 days.

(21) Appl. No.: 14/051,598

(22) Filed: Oct. 11, 2013

(65) Prior Publication Data

US 2014/0174117 A1    Jun. 26, 2014

(30) Foreign Application Priority Data

Dec. 25, 2012   (JP) ................... 2012-280510

(51) Int. Cl.
F24D 19/00 (2006.01)
F24D 3/18 (2006.01)
(Continued)

(52) U.S. Cl.
CPC ........... *F24D 3/18* (2013.01); *F24D 19/1039* (2013.01); *F24D 19/1072* (2013.01); *F24F 3/06* (2013.01);
(Continued)

(58) Field of Classification Search
CPC . F25B 13/00; F25B 2339/047; F24F 11/0012; F24F 2011/0091; F24D 17/02; F24D 9/1039
(Continued)

(56) References Cited

U.S. PATENT DOCUMENTS 4,611,470 A * 9/1986 Enstrom ............... F25B 49/02
62/127
5,042,265 A * 8/1991 Baldwin ............ F24F 11/0009
236/94
(Continued)

FOREIGN PATENT DOCUMENTS

CN    102326040 A    1/2012
CN    102483242 A    5/2012
(Continued)

OTHER PUBLICATIONS

Nakamura, Yoshihiro, JP 2008241165 TRANS (English Translation), Oct. 2008.*
(Continued)

*Primary Examiner* — Justin Jonaitis
*Assistant Examiner* — Eric Ruppert
(74) *Attorney, Agent, or Firm* — POSZ Law Group, PLC (57) ABSTRACT

An object is to enable the dealer or user of an air conditioning apparatus to recognize that the heat dissipation amount of a heat exchange device is less than the heat dissipation amount expected of the air conditioning apparatus. A control device detects a hot water outflow temperature being a temperature of a fluid heated by a heat pump device, and a return temperature being a temperature of the fluid before being heated by the heat pump device, and checks whether or not a temperature difference between the detected hot water outflow temperature and the detected return temperature is smaller than a predetermined first value. If the control device judges that the temperature difference is smaller than the first value, it displays insufficiency of the heat dissipation amount of a heat exchange device, on a display of a remote controller.

5 Claims, 8 Drawing Sheets

(51) Int. Cl.
  *F24D 19/10* (2006.01)
  *F24F 3/06* (2006.01)
  *F24F 5/00* (2006.01)
  *F24D 17/02* (2006.01)

(52) U.S. Cl.
  CPC .......... *F24F 5/0003* (2013.01); *F24F 5/0096* (2013.01); *F24D 17/02* (2013.01); *F24D 2200/12* (2013.01); *F24D 2220/042* (2013.01)

(58) Field of Classification Search
  USPC .................. 62/125, 129, 160, 238.7, 238.6
  See application file for complete search history.

(56) References Cited

U.S. PATENT DOCUMENTS

| | | |
|---|---|---|
| 8,769,974 B2 | 7/2014 | Honda |
| 2010/0206869 A1 | 8/2010 | Nelson et al. |
| 2011/0302947 A1 | 12/2011 | Honda |
| 2011/0302948 A1 | 12/2011 | Honda |
| 2014/0174117 A1 | 6/2014 | Aoyagi et al. |

FOREIGN PATENT DOCUMENTS

| | | |
|---|---|---|
| CN | 102628627 A | 8/2012 |
| CN | 203629017 U | 6/2014 |
| JP | H11-094327 A | 4/1999 |
| JP | 2001-099459 A | 4/2001 |
| JP | 2003-294290 A | 10/2003 |
| JP | 2007-010242 A | 1/2007 |
| JP | 2008241165 | * 10/2008 |
| JP | 2009-275941 A | 11/2009 |
| JP | 2009-287895 A | 12/2009 |
| JP | 2010-196946 A | 9/2010 |
| JP | 2011-220621 A | 11/2011 |

OTHER PUBLICATIONS

Office Action dated Dec. 24, 2014 issued in corresponding JP patent application No. 2012-280510 (and partial English translation).
Extended European Search Report (EESR) dated Apr. 10, 2014 in corresponding EP Application No. 13190958.2 (English).
Chinese Office Action dated Dec. 30, 2015 in the corresponding CN application No. 201310548064.0(English translation attached).
Communication pursuant to Article 94(3) EPC dated Aug. 11, 2016 issued in corresponding EP patent application No. 13 190 958.2.

* cited by examiner

AIR CONDITIONING APPARATUS

CROSS-REFERENCE TO RELATED APPLICATIONS

This application is based on and claims the benefit of priority from Japanese Patent Application No. 2012-280510, filed in Japan on Dec. 25, 2012, the content of which is incorporated herein by reference in its entirety.

TECHNICAL FIELD

The present invention relates to an air conditioning apparatus which heats a room by supplying a fluid heated by a heat pump device to a heat exchange device.

BACKGROUND ART

An air conditioning apparatus is available that increases the room temperature by heating water with a heat pump device and supplying the heated water to a heat exchange device such as a floor heating panel or a radiator installed in the room. The heat exchange device used in the air conditioning apparatus may be the one prepared by a dealer or the like in charge of installing the air conditioning apparatus, or the one installed on the site from the beginning. Hence, sometimes the heat dissipation amount of the heat exchange device may be less than the heat dissipation amount expected of the air conditioning apparatus.

Patent Literatures 1 and 2 describe control of the temperature of water to be supplied to the heat exchange device or detection of an abnormality by detection of the temperature of the water.

CITATION LIST

Patent Literature

[Patent Literature 1] JP2007-10242 A
[Patent Literature 2] JP2001-99459 A

SUMMARY OF INVENTION

Technical Problem

With the techniques described in Patent Literatures 1 and 2, when the heat dissipation amount of the heat exchange apparatus is less than the heat dissipation amount expected of the air conditioning apparatus, the water temperature can be controlled as much as possible in accordance with the heat dissipation amount of the heat exchange device, or the heat pump device can be stopped based on an abnormality judgment.

With the techniques described in Patent Literatures 1 and 2, the dealer or the user is not able to recognize that the heat dissipation amount of the heat exchange device is less than the heat dissipation amount expected of the air conditioning apparatus. As a result, the heat exchange device having an insufficient heat dissipation amount will be used continuously. This may lead to a poor efficiency, or a comfortable room environment cannot be created.

It is an object of the present invention to enable the dealer or the user to recognize that the heat dissipation amount of the heat exchange device is less than the heat dissipation amount expected of an air conditioning apparatus.

Solution to Problem

An air conditioning apparatus according to the present invention is
an air conditioning apparatus which increases a room temperature by supplying a fluid heated by a heat pump device to a heat exchange device installed in a room, comprising:
a hot water outflow temperature detection part which detects a hot water outflow temperature being a temperature of the fluid after being heated by the heat pump device;
a return temperature detection part which detects a return temperature being a temperature of the fluid before being heated by the heat pump device;
a temperature difference checking part which checks whether or not a temperature difference between the hot water outflow temperature detected by the hot water outflow temperature detection part and the return temperature detected by the return temperature detection part is smaller than a predetermined first threshold; and
a notification part which, when the temperature difference checking part judges that the temperature difference is smaller than the first threshold, notifies that the heat exchange device has a heat dissipation amount that is insufficient.

Advantageous Effects of Invention

In the air conditioning apparatus according to the present invention, whether or not the heat dissipation amount of the heat exchange device is insufficient is checked based on the temperature difference between a hot water outflow temperature and a return temperature. If the heat dissipation amount is insufficient, it is notified to the dealer or the user. Thus, the dealer or the user can recognize that the heat dissipation amount of the heat exchange device is less than the heat dissipation amount expected of the air conditioning apparatus, and can take a countermeasure such as exchanging the heat exchange device.

BRIEF DESCRIPTION OF DRAWINGS

The present invention will become fully understood from the detailed description given hereinafter in conjunction with the accompanying drawings, in which.

DESCRIPTION OF EMBODIMENTS

In describing preferred embodiments illustrated in the drawings, specific terminology is employed for the sake of clarity. However, the disclosure of the present invention is not intended to be limited to the specific terminology so selected, and it is to be understood that each specific element includes all technical equivalents that operate in a similar manner and achieve a similar result.

Embodiment 1

Figure 1:
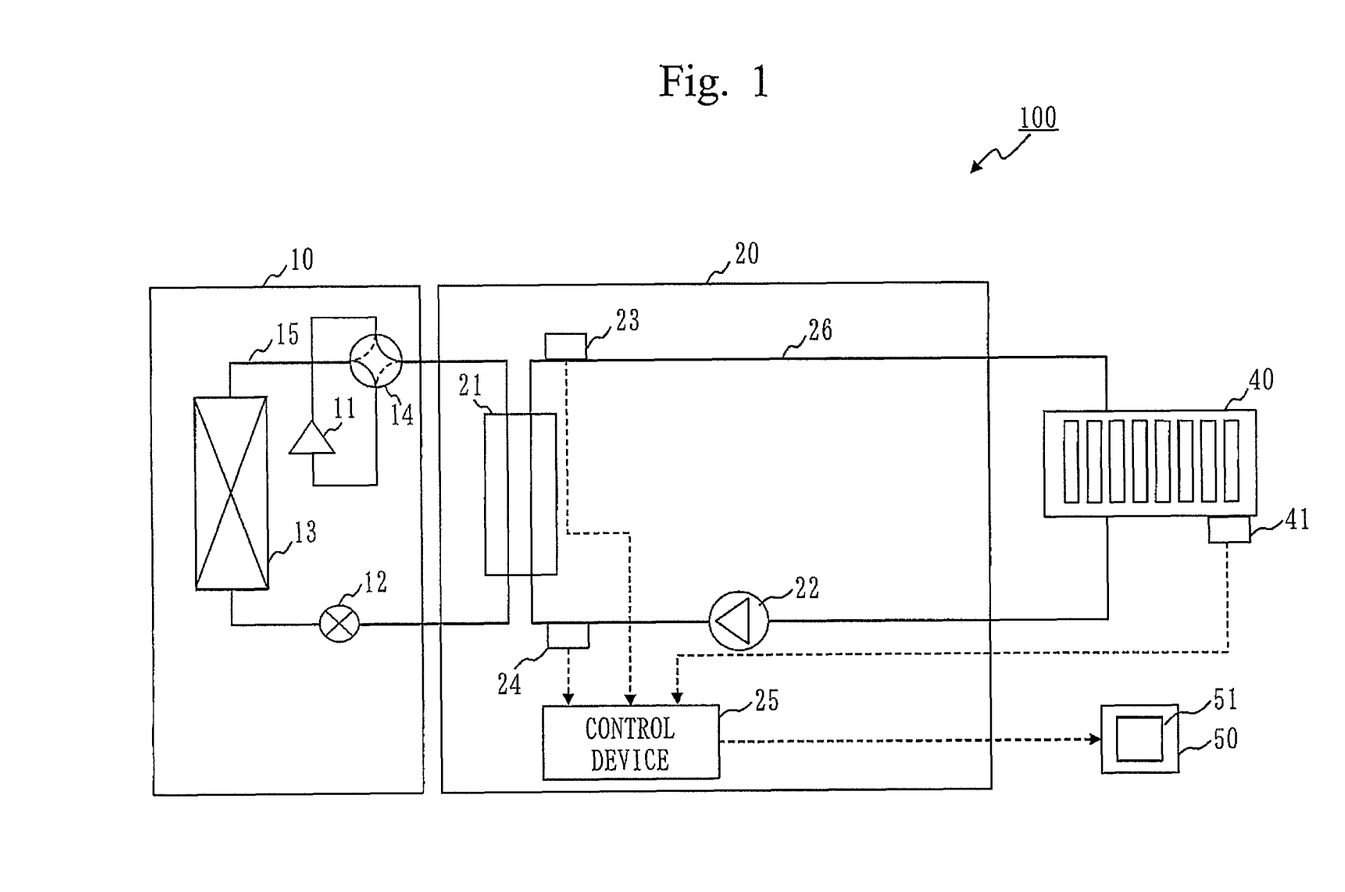
FIG. 1 is a block diagram of an air conditioning apparatus 100 according to Embodiment 1.

FIG. 1 is a block diagram of an air conditioning apparatus 100 according to Embodiment 1.

The air conditioning apparatus 100 includes a heat pump device 10, a water circulation device 20, a heat exchange device 40, and a remote controller 50. The heat pump device 10 includes a compressor 11, an expansion valve 12, a heat exchanger 13, and a four-way valve 14. The water circulation device 20 includes a heat exchanger 21, a pump 22, a temperature sensor 23, a temperature sensor 24, and a control device 25.

In the air conditioning apparatus 100, the compressor 11, the heat exchanger 21, the expansion valve 12, and the heat exchanger 13 are sequentially connected by pipes, to constitute a refrigerant circuit 15 where a refrigerant such as R410A circulates. In the refrigerant circuit 15, the four-way valve 14 is connected to the discharge side of the compressor 11 so that the refrigerant circulating direction can be changed.

In the air conditioning apparatus 100, the heat exchanger 21, the heat exchange device 40, and the pump 22 are sequentially connected by pipes, to constitute a water circuit 26 where water circulates.

The temperature sensor 23 detects the hot water outflow temperature which is the temperature of water heated by the heat exchanger 21. The temperature sensor 24 detects a return temperature which is the temperature of water before being heated by the heat exchanger 21. A temperature sensor 41 is provided near the heat exchange device 40. The temperature sensor 41 detects a room temperature which is the temperature of the room where the heat exchange device 40 is installed.

Based on the temperatures and the like detected by the temperature sensors 23, 24, and 41, the control device 25 controls the operation frequency of the compressor 11, the opening of the expansion valve 12, the rotation speed of the pump 22, and the like. The control device 25 is formed of a microcomputer or the like. A different control device may be provided to the heat pump device 10. Devices included in the heat pump device 10 may be controlled by the control device provided to the heat pump device 10.

The heat exchange device 40 is, for example, a floor heating panel or a radiator. Alternatively, the heat exchange device 40 may be formed by combining a floor heating panel, a radiator, and the like.

The remote controller 50 is a device that enables the user to, for example, instruct operation start, operation stop, and the like to the air conditioning apparatus 100, and to set a target temperature of the room temperature. The remote controller 50 has a display 51 that displays information such as current operation status.

Figure 2:
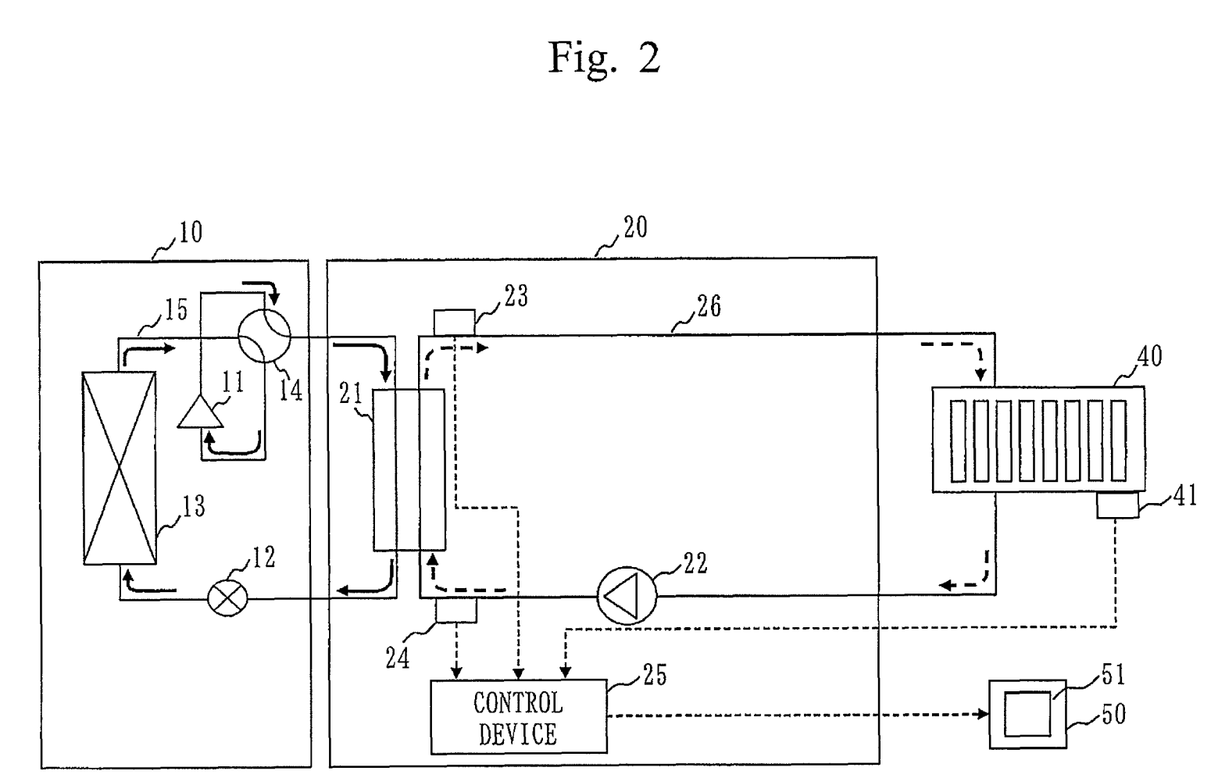
FIG. 2 is a diagram showing behavior in the heating operation of the air conditioning apparatus 100 shown in FIG. 1.

FIG. 2 is a diagram showing behavior in the heating operation of the air conditioning apparatus 100 shown in FIG. 1.

Referring to FIG. 2, solid-line arrows indicate the flow of the refrigerant, and thick broken-line arrows indicate the flow of water.

In the heating operation, in the refrigerant circuit 15, the four-way valve 14 is set for the solid-line flow channel in FIG. 1, and the refrigerant circulates through the compressor 11, the heat exchanger 21, the expansion valve 12, and the heat exchanger 13 in the order named. In the water circuit 26, water circulates through the heat exchanger 21, the heat exchange device 40, and the pump 22 in the order named.

In the refrigerant circuit 15, the high-temperature, high-pressure refrigerant discharged from the compressor 11 flows into the heat exchanger 21. The refrigerant and water exchange heat in the heat exchanger 21, so that the water is heated and the refrigerant is cooled. The cooled refrigerant is pressure-reduced as it passes through the expansion valve 12, and flows into the heat exchanger 13. Then, the refrigerant and the outdoor air exchange heat in the heat exchanger 13, so that the refrigerant is heated. The heated refrigerant is compressed by the compressor 11 to be restored to a high-temperature, high-pressure refrigerant.

In the water circuit 26, the water heated by the heat exchanger 21 flows into the heat exchange device 40. The room air and the water are respectively heated and cooled by the heat exchange device 40. The cooled water flows through the pump 22 and is heated again by the heat exchanger 21.

The room air is gradually heated in this manner.

The heat exchange device 40 to be used may be the one selected by the dealer in charge of installing the air conditioning apparatus 100, or the one installed on the site from the beginning. Hence, sometimes the heat dissipation amount of the heat exchange device 40 is insufficient because, for example, the heat exchange area of the heat exchange device 40 is small for the heat dissipation amount expected of the air conditioning apparatus 100.

In particular, although the air conditioning apparatus 100 shown in FIG. 1 is supposed to use the heat pump device 10 as the heat source, it conventionally uses a boiler as the heat source. The temperature of the hot water generated by the heat pump device 10 is lower than the temperature of the hot water generated by the boiler. Particularly, when the outdoor temperature is low, the temperature of the hot water generated by the heat pump device 10 is low. However, there are cases where the dealer does not understand this fact well and may erroneously select a heat exchange device 40 that is rather suitable for a boiler, or the dealer may use a heat exchange device 40 installed at the site from the beginning and rather suitable for a boiler. Hence, sometimes the heat dissipation amount of the heat exchange device 40 is less than the heat dissipation amount expected of the air conditioning apparatus 100.

In view of this, the control device 25 conducts a heat dissipation amount checking process of checking whether or not the heat dissipation amount of the heat exchange device 40 is sufficient based on the temperatures detected by the temperature sensors 23, 24, and 41, and displaying the result on the display 51 provided to the remote controller 50. Thus, if the heat dissipation amount of the heat exchange device 40 is not sufficient, the control device 25 makes the dealer or the user recognize this fact, and prompts the dealer or the user to exchange the heat exchange device 40 or the like.

Figure 3:
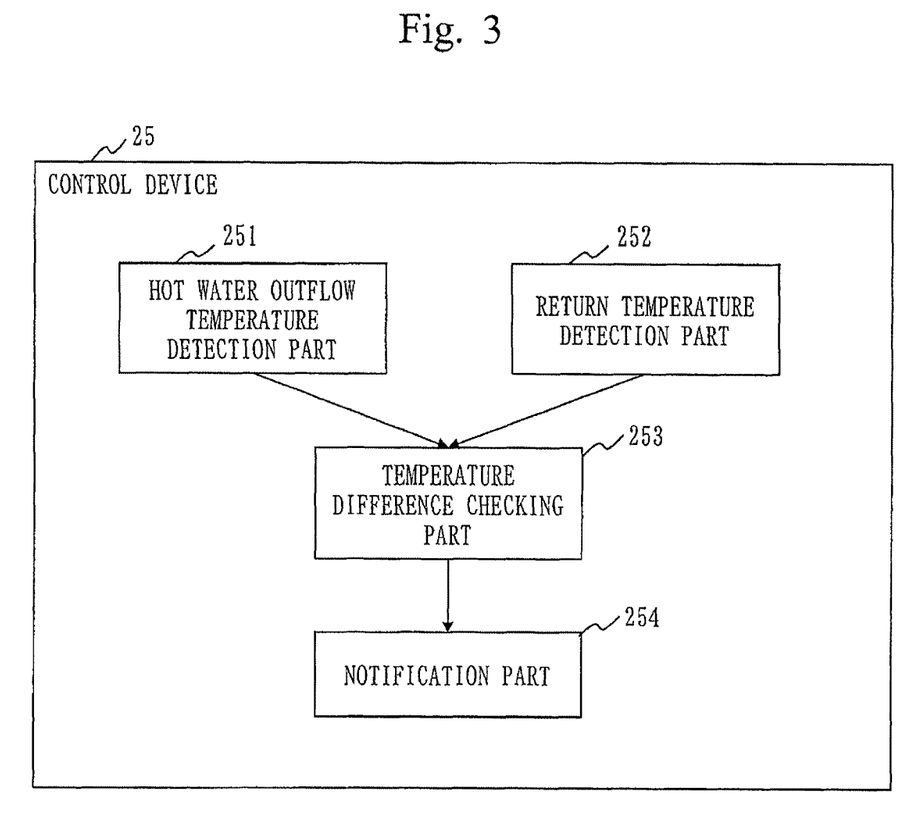
FIG. 3 is a block diagram of a control device 25 according to Embodiment 1.

FIG. 3 is a block diagram of the control device 25 according to Embodiment 1.

The control device 25 includes a hot water outflow temperature detection part 251, a return temperature detection part 252, a temperature difference checking part 253, and a notification part 254.

Figure 4:
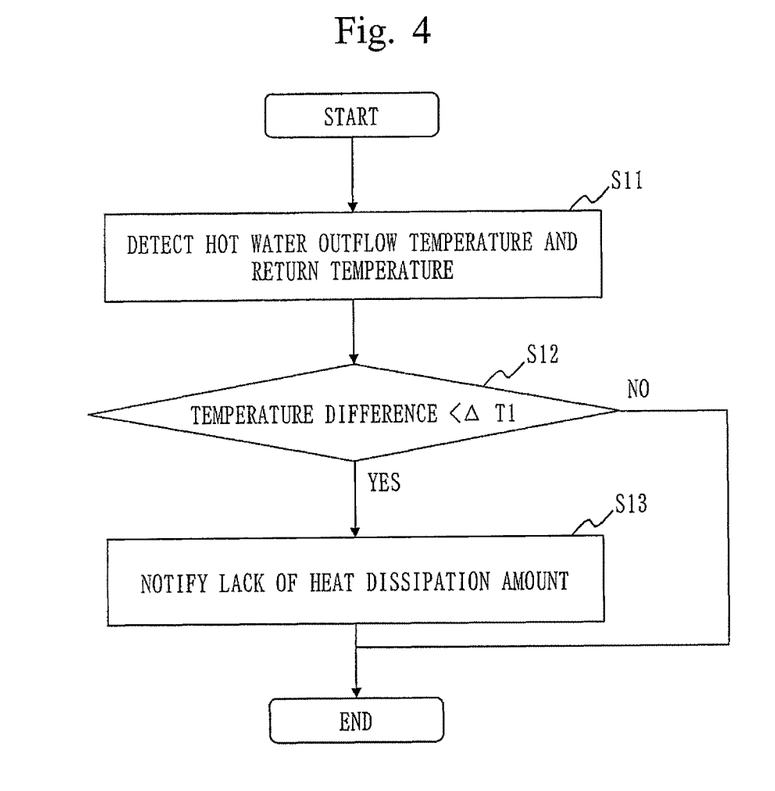
FIG. 4 is a flowchart showing the flow of a heat dissipation amount checking process according to Embodiment 1.

FIG. 4 is a flowchart showing the flow of the heat dissipation amount checking process according to Embodiment 1.

(S11: Temperature Detection Process)

When the heating operation is started and several minutes pass, the hot water outflow temperature detection part 251 detects the hot water outflow temperature with the temperature sensor 23, and the return temperature detection part 252 detects the return temperature with the temperature sensor 24.

(S12: Heat Dissipation Amount Check Process)

The temperature difference checking part 253 checks whether or not a residential environment temperature difference which is the difference between the hot water outflow temperature and return temperature detected in S11 is smaller than a predetermined first threshold ΔT1 (for example, 5° C.). 5° C. cited as an example of the first threshold ΔT1 is a temperature determined by the test articles in EN14511 of EN Standards. The EN Standards are a European standardization issued by CEN (European Committee for Standardization), CENELEC (European Committee for Electrotechnical Standardization), and ETSI (European Telecommunications Standards Institute) formed of 30 European countries.

If the residential environment temperature difference is smaller than the first threshold ΔT1 (YES in S12), the process proceeds to S13. If the residential environment temperature difference is equal to or larger than the first threshold ΔT1 (NO in S12), the heat dissipation amount checking process is ended.

(S13: Notification Process)

If the residential environment temperature difference is smaller than the first threshold ΔT1, the notification part 254 judges that the heat dissipation amount of the heat exchange device 40 is insufficient. The control device 25 notifies the user and the dealer in charge of installation of information indicating insufficiency of the heat dissipation amount of the heat exchange device 40, by displaying the information on the display 51 of the remote controller 50.

As described above, in the heating operation, the air conditioning apparatus 100 according to Embodiment 1 checks whether or not the heat dissipation amount of the heat exchange device 40 is sufficient based on the residential environment temperature difference, and if the heat dissipation amount is not sufficient, notifies this to the dealer or the user. Thus, the dealer or the user can recognize that the heat dissipation amount of the heat exchange device 40 is less than the heat dissipation amount expected of the air conditioning apparatus 100, and can take a countermeasure such as exchanging the heat exchange device 40.

The control device 25 controls the compressor 11, the expansion valve 12, and the like so that when conducting the heat dissipation amount checking process, the hot water outflow temperature becomes the upper-limit hot water outflow temperature (for example, 50° C.) for the minimum outdoor temperature.

The control device 25 may check whether or not the heat dissipation amount of the heat exchange device 40 is sufficient not only based on the residential environment temperature difference but also by considering whether or not the room temperature has increased.

In this case, in S11, using the temperature sensor 41, the control device 25 (room temperature detection part) detects the room temperature at the start of the heating operation as well as the room temperature at a lapse of several minutes since the start of the heating operation. In S12, the control device 25 (temperature difference checking part 253) checks whether the residential temperature difference is smaller than the first threshold ΔT1. The control device 25 (temperature difference checking part 253) also checks whether or not a room temperature difference which is the temperature difference between the room temperature at the start of the heating operation and the room temperature at a lapse of several minutes since the start of the heating operation is smaller than a predetermined second threshold ΔT2 (for example, 1° C.). If the residential environment temperature difference is smaller than the first threshold ΔT1 and the room temperature difference is smaller than the second threshold ΔT2, the control device 25 judges that the heat dissipation amount of the heat exchange device 40 is insufficient.

The temperature difference between the room temperature at the start of the heating operation and the room temperature at a lapse of several minutes since the start of the heating operation is determined as the room temperature difference. Alternatively, the temperature difference between the room temperature at a lapse of several minutes since the start of the heating operation and the room temperature at a lapse of another several minutes since then may be determined as the room temperature difference.

In this embodiment, the control device 25 displays on the display 51 of the remote controller 50 information indicating the insufficiency of the heat dissipation amount of the heat exchange device 40. Alternatively, the control device 25 may display the information on, for example, a computer such as a PC (Personal Computer) connected to the air conditioning apparatus 100.

Figure 5:
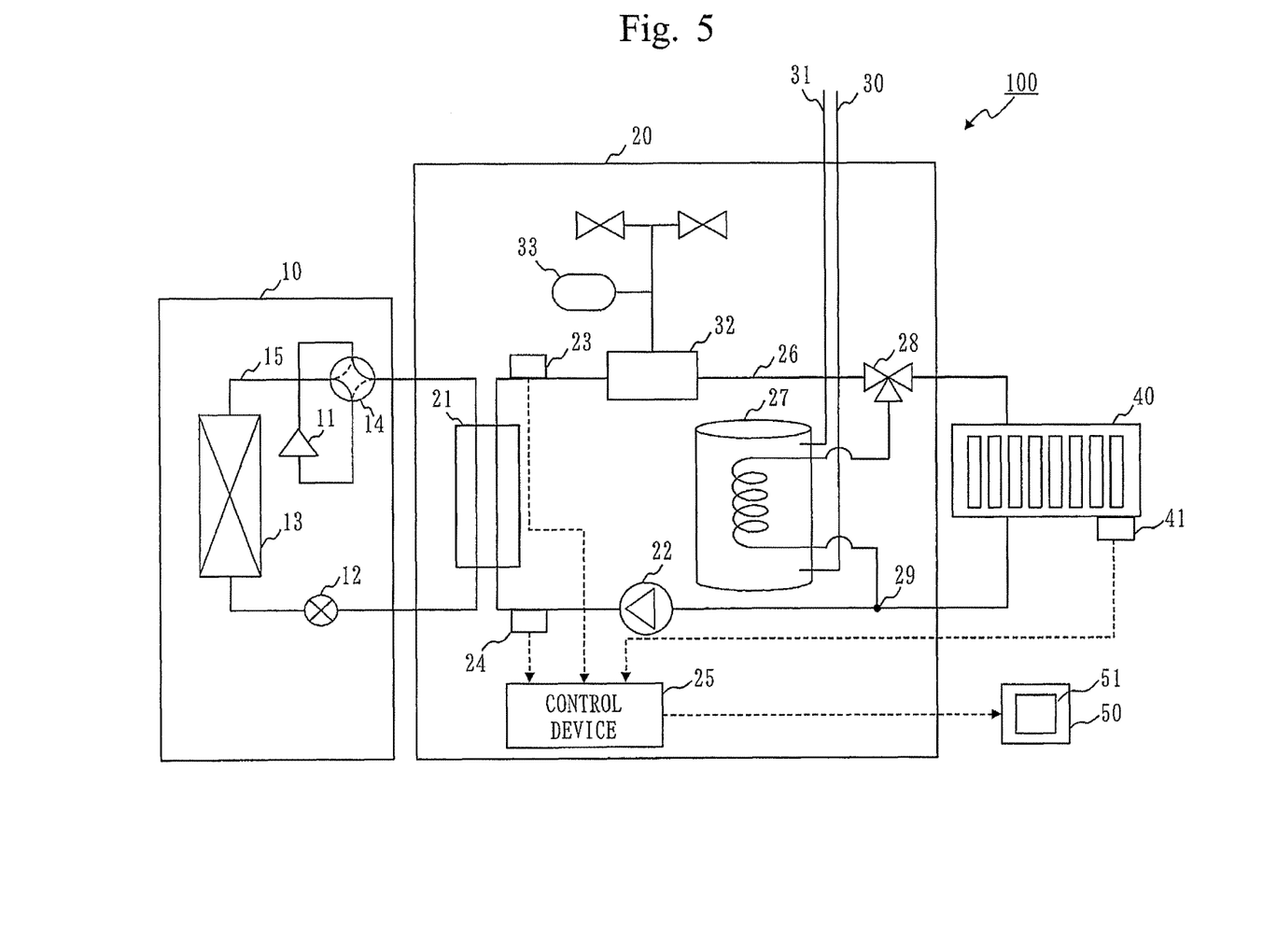
FIG. 5 is a block diagram of a modification of the air conditioning apparatus 100 according to Embodiment 1.

As shown in FIG. 5, the water circulation device 20 may include a tank 27 in addition to the structure shown in FIG. 1.

The tank 27 is provided midway along the flow channel that connects with pipes the three-way valve 28 between the heat exchanger 21 and the heat exchange device 40, to the junction 29 between the heat exchange device 40 and the heat exchanger 21, in the water circuit 26. The tank 27 is almost circular cylindrical. At least the outer shell of the tank 27 is made of a metal material such as stainless steel and is covered with a heat-insulating material. The tank 27 stores water in it. During the heating operation described above, the three-way valve 28 is controlled to supply water to the tank 27. Hence, water stored in the tank 27 and water flowing through the water circuit 26 exchange heat, so that the water stored in the tank 27 is heated. A thermal stratification is formed in the tank 27 such that the higher in the tank 27, the higher the temperature, and the lower in the tank 27, the lower the temperature.

A water supply pipe 30 to supply water into the tank 27 is connected to the lower portion of the tank 27. A hot water outflow pipe 31 to supply water stored in the tank 27 and heated to a shower or the like is connected to the upper portion of the tank 27.

As shown in FIG. 5, the water circulation device 20 may include a heater 32, an expansion tank 33, or the like in addition to the structure shown in FIG. 1.

The heater 32 is an auxiliary heating device to further heat the water when the water circulating in the water circuit 26 cannot be sufficiently heated by the heat exchanger 21. The expansion tank 33 is a tank to adjust the pressure in the water circuit 26.

Embodiment 2

Embodiment 1 explains how whether the heat dissipation amount of the heat exchange device 40 is sufficient or not is checked in the heating operation. In Embodiment 2, a test operation mode is provided, and whether or not the heat dissipation amount of the heat exchange device 40 is sufficient is checked in the test operation mode.

The cooling operation of the air conditioning apparatus 100, being the premise of the test operation mode, will be described.

Figure 6:
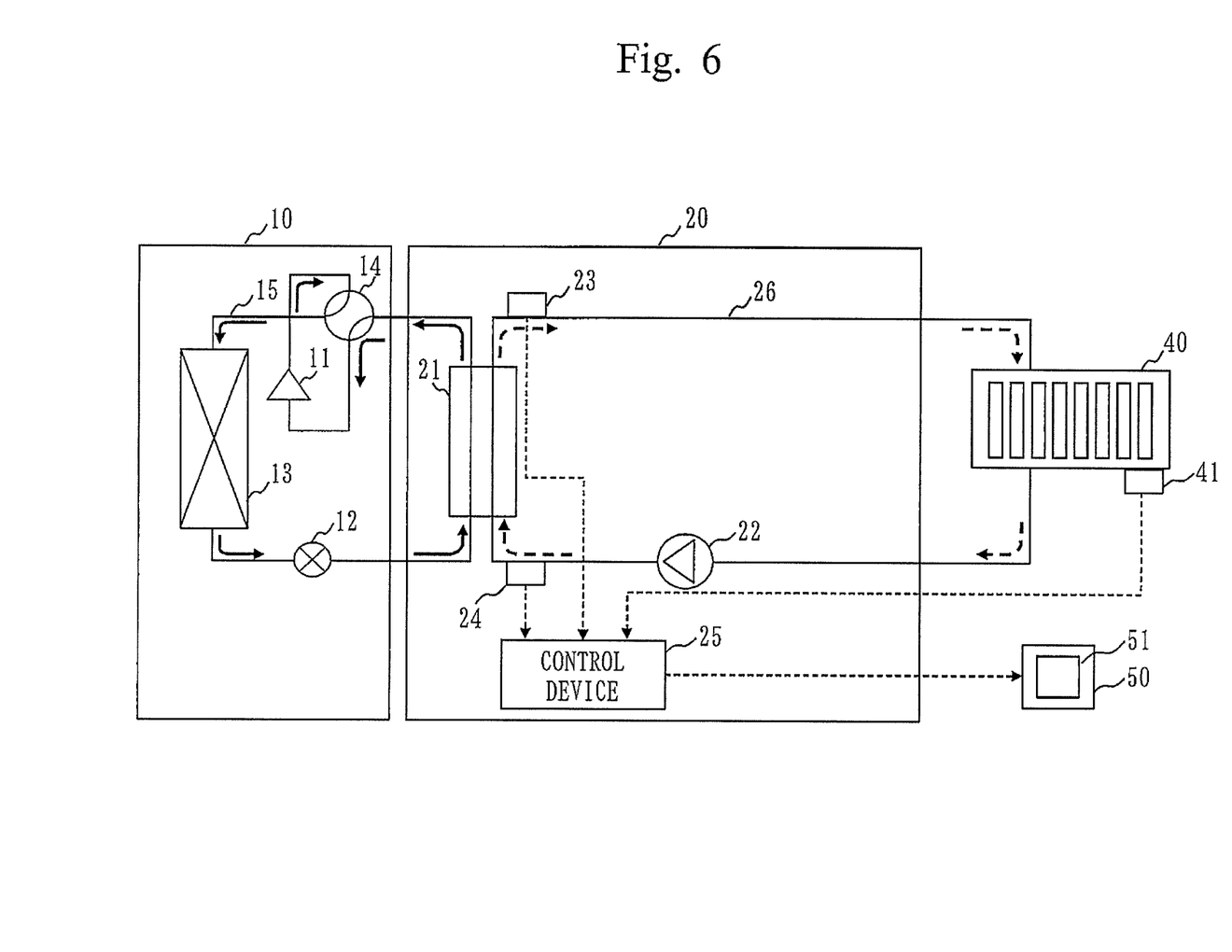
FIG. 6 is a diagram showing behavior in the cooling operation of the air conditioning apparatus 100 shown in FIG. 1.

FIG. 6 is a diagram showing behavior in the cooling operation of the air conditioning apparatus 100 shown in FIG. 1.

Referring to FIG. 6, solid-line arrows indicate the flow of the refrigerant, and thick broken-line arrows indicate the flow of water.

In the cooling operation, in the refrigerant circuit 15, the four-way valve 14 is set for the broken-line flow channel, and the refrigerant circulates through the compressor 11, the heat exchanger 13, the expansion valve 12, and the heat exchanger 21 in the order named. In the water circuit 26, water circulates through the heat exchanger 21, the heat exchange device 40, and the pump 22 in the order named.

In the refrigerant circuit 15, the high-temperature, high-pressure refrigerant discharged from the compressor 11 flows into the heat exchanger 13. The refrigerant and the outdoor air exchange heat in the heat exchanger 13, so that the refrigerant is cooled. The cooled refrigerant is pressure-reduced as it passes through the expansion valve 12, and flows into the heat exchanger 21. Then, the refrigerant and water exchange heat in the heat exchanger 21, so that the water is cooled and the refrigerant is heated. The heated refrigerant is compressed by the compressor 11 to be restored to a high-temperature, high-pressure refrigerant.

In the water circuit 26, the water cooled by the heat exchanger 21 flows into the heat exchange device 40. The room air and the water are respectively cooled and heated by the heat exchange device 40. The heated water flows through the pump 22 and is cooled again by the heat exchanger 21.

The room air is gradually cooled in this manner.

In the test operation mode, cooling operation is conducted to decrease the room temperature. Then, heating operation is conducted, and whether or not the heat dissipation amount of the heat exchange device 40 is sufficient is checked. Checking is conducted after the room temperature is forcedly decreased by the cooling operation. Thus, whether or not the heat dissipation amount of the heat exchange device 40 is sufficient can be checked with accuracy.

Figure 7:
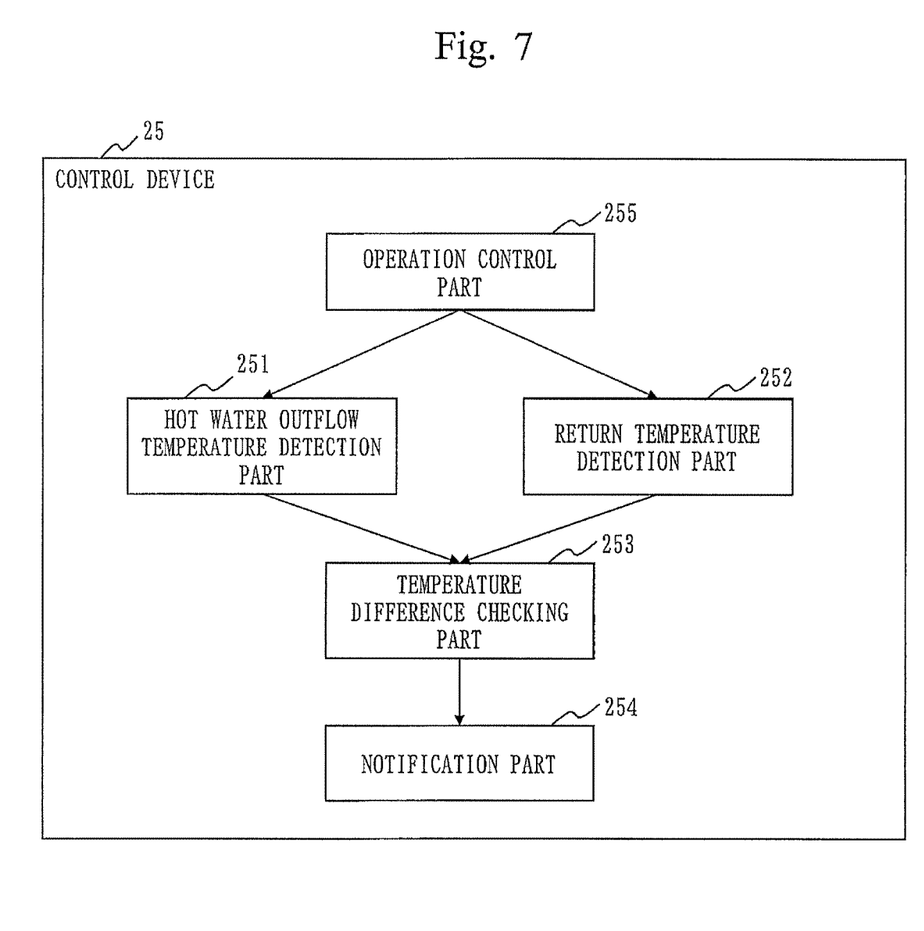
FIG. 7 is a block diagram of a control device 25 according to Embodiment 2.

FIG. 7 is a block diagram of a control device 25 according to Embodiment 2.

The control device 25 includes an operation control part 255 in addition to the functional parts shown in FIG. 3.

Figure 8:
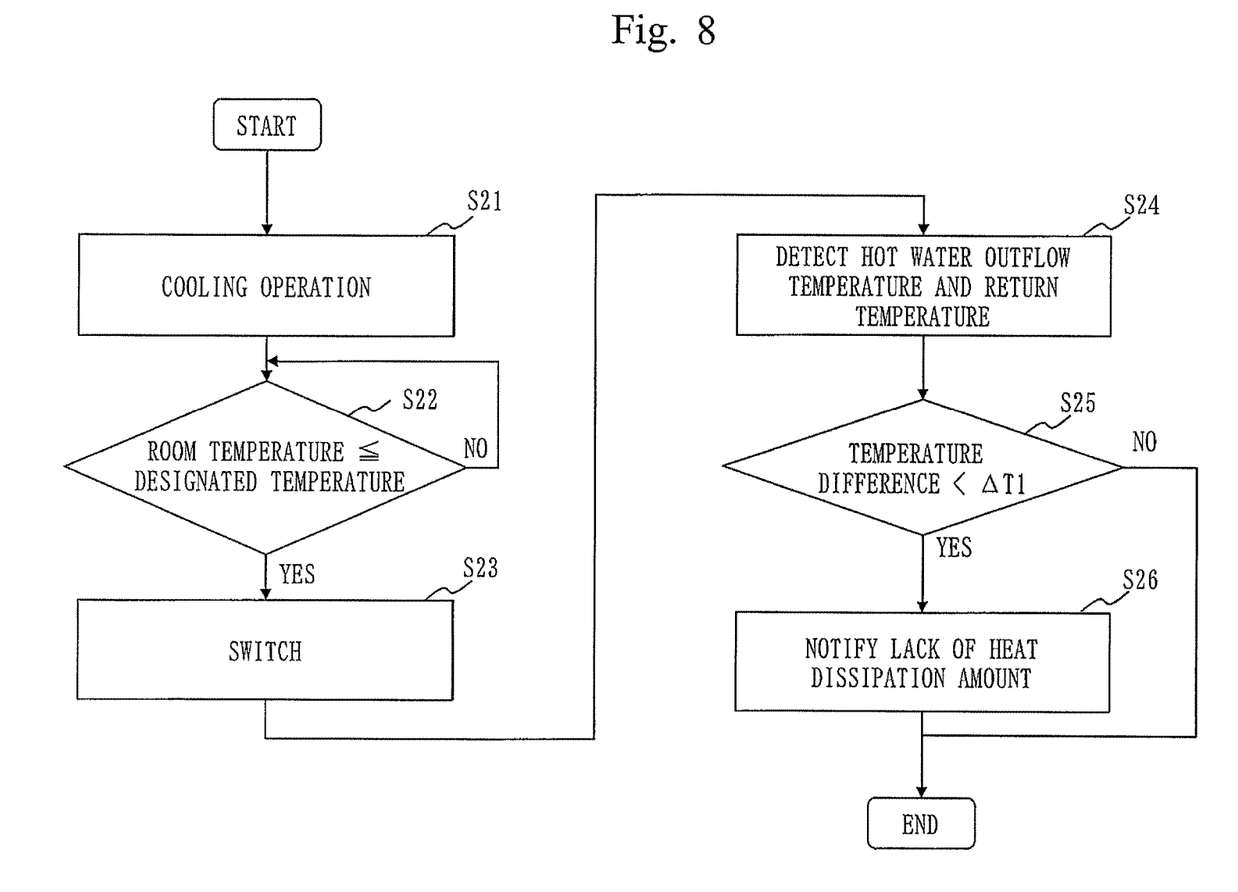
FIG. 8 is a flowchart showing the flow of a heat dissipation amount checking process according to Embodiment 2.

FIG. 8 is a flowchart showing the flow of a heat dissipation amount checking process according to Embodiment 2.

(S21: Cooling Process)

When the remote controller 50 or the like instructs execution of the test operation mode, the operation control part 255 sets the four-way valve 14 for the broken-line flow channel in FIG. 1, and starts the cooling operation.

(S22: Switching Check Process)

The operation control part 255 detects the room temperature with the temperature sensor 41, and checks whether or not the detected room temperature is equal to or less than a predetermined designated temperature (for example, 20° C.).

If the room temperature is equal to or less than the designated temperature (YES in S22), the process proceeds to S23. If the room temperature is higher than the designated temperature (NO in 822), the cooling operation is continued. When a predetermined period of time passes, checking is performed again in S22.

(S23: Switching Process)

The operation control part 255 sets the four-way valve 14 for the solid-line flow channel in FIG. 1, and conducts the heating operation. At this time, when executing the heat dissipation amount check process, the operation control part 255 controls the compressor 11, the expansion valve 12, and the like so that the hot water outflow temperature reaches the upper-limit hot water outflow temperature (for example, 50° C.) for the minimum outdoor temperature.

The process from (S24) to (S26) is the same as the process from (S11) to (S13) shown in FIG. 3.

As described above, the air conditioning apparatus 100 according to Embodiment 2 conducts checking after forcedly reducing the room temperature by the cooling operation. Hence, even if the air conditioning apparatus 100 is installed in, for example, a season where the heating load is low, whether the heat dissipation amount of the heat exchange device 40 is sufficient can be determined appropriately at the time of installation.

In Embodiment 2, the control device 25 may check whether or not the heat dissipation amount of the heat exchange device 40 is sufficient not only based on the residential environment temperature difference but also by considering whether or not the room temperature has increased, in the same manner as in Embodiment 1.

Numerous additional modifications and variations are possible in light of the above teachings. It is therefore to be understood that, within the scope of the appended claims, the disclosure of this patent specification may be practiced otherwise than as specifically described herein.

REFERENCE SIGNS LIST

10: heat pump device; 11: compressor; 12: expansion valve; 13: heat exchanger; 14: four-way valve; 15: refrigerant circuit; 20: water circulation device; 21: heat exchanger; 22: pump; 23: temperature sensor; 24: temperature sensor; 25: control device: 26: water circuit; 27: tank; 28: three-way valve; 29: junction: 30: water supply pipe; 31: hot water outflow pipe; 32: heater; 33: expansion tank; 40: heat exchange device; 41: temperature sensor; 50: remote controller; 51: display; 100: air conditioning apparatus: 251: hot water outflow temperature detection part; 252: return temperature detection part; 253: temperature difference checking part; 254: notification part; 255: operation control part

The invention claimed is:

1. An air conditioning apparatus adapted to increase a room temperature by supplying a fluid heated by a heat pump device to a heat exchange device installed in a room, comprising:

a hot water outflow temperature detection part which detects a hot water outflow temperature being a temperature of the fluid after being heated by the heat pump device;

a return temperature detection part which detects a return temperature being a temperature of the fluid before being heated by the heat pump device;

a temperature difference checking part which checks whether or not a temperature difference between the hot water outflow temperature detected by the hot water outflow temperature detection part and the return temperature detected by the return temperature detection part is smaller than a predetermined first threshold;

a room temperature detection part which detects a room temperature being a temperature of the room where the heat exchange device is installed;

a room temperature checking part which checks whether or not a post-temperature being a room temperature detected by the room temperature detection part at a lapse of a predetermined period of time since a predetermined timing, is higher than a pre-temperature being a room temperature detected by the room temperature detection part at the predetermined timing, by not less than a predetermined second threshold; and a notification part which determines whether heat dissipation amount is insufficient based on both (i) the temperature difference checking part judges that the temperature difference is smaller than the first threshold and (ii) the room temperature checking part judges that the post-temperature is not higher than the pre-temperature by not less than the second threshold, and only when both (i) and (ii) exist, the notification part notifies that the heat exchange device has a heat dissipation amount that is insufficient.

2. The air conditioning apparatus according to claim 1, wherein the heat pump device is capable of not only heating the fluid but also cooling the fluid, the air conditioning apparatus further comprising:

an operation control part which conducts a test operation including: executing a cooling operation of decreasing the room temperature by cooling the fluid with the heat pump device and supplying the fluid cooled to the heat exchange device; and thereafter executing a heating operation of increasing the room temperature by heating the fluid with the heat pump device and supplying the fluid heated to the heat exchange device, wherein the temperature difference checking part checks whether or not the temperature difference is smaller than the first threshold while the operation control part executes the heating operation in the test operation.

3. The air conditioning apparatus according to claim 1, wherein the heat pump device is capable of not only heating the fluid but also cooling the fluid, the air conditioning apparatus further comprising:

an operation control part which conducts a test operation including: executing cooling operation of decreasing the room temperature by cooling the fluid with the heat pump device and supplying the fluid cooled to the heat exchange device; and thereafter executing a heating operation of increasing the room temperature by heating the fluid with the heat pump device and supplying the fluid heated to the heat exchange device, wherein the temperature difference checking part checks whether or not the temperature difference is smaller than the first threshold while the operation control part executes the heating operation in the test operation, and wherein the room temperature checking part checks whether or not the post-temperature being the room temperature detected by the room temperature detection part at the lapse of the predetermined period of time since the heating operation is started, is higher than the pre-temperature being the room temperature detected by the room temperature detection part when the heating operation is started, by not less than the predetermined second threshold.

4. The air conditioning apparatus according to claim 1, wherein the notification part notifies information indicating that the heat dissipation amount of the heat exchange device is insufficient, by displaying the information on at least either one of a remote controller of the air conditioning apparatus and a computer connected to the air conditioning apparatus.

5. The air conditioning apparatus according to claim 1, wherein the heat pump device is configured to heat the fluid and cool the fluid, further comprising:

an operation control part which conducts a test operation that checks whether the heat dissipation amount of the heat exchange device is sufficient, the operation control part is configured to, as the test operation:

execute a cooling operation of decreasing the room temperature by cooling the fluid with the heat pump device and supplying the fluid cooled to the heat exchange device; and then execute a heating operation of increasing the room temperature, which was decreased, by heating the fluid with the heat pump device and supplying the fluid heated to the heat exchange device; and check, while the operation control part executes the heating operation in the test operation, by the temperature difference checking part, whether or not the temperature difference between the hot water outflow temperature and the return temperature is smaller than the first threshold.

* * * * *